Patented Dec. 2, 1930

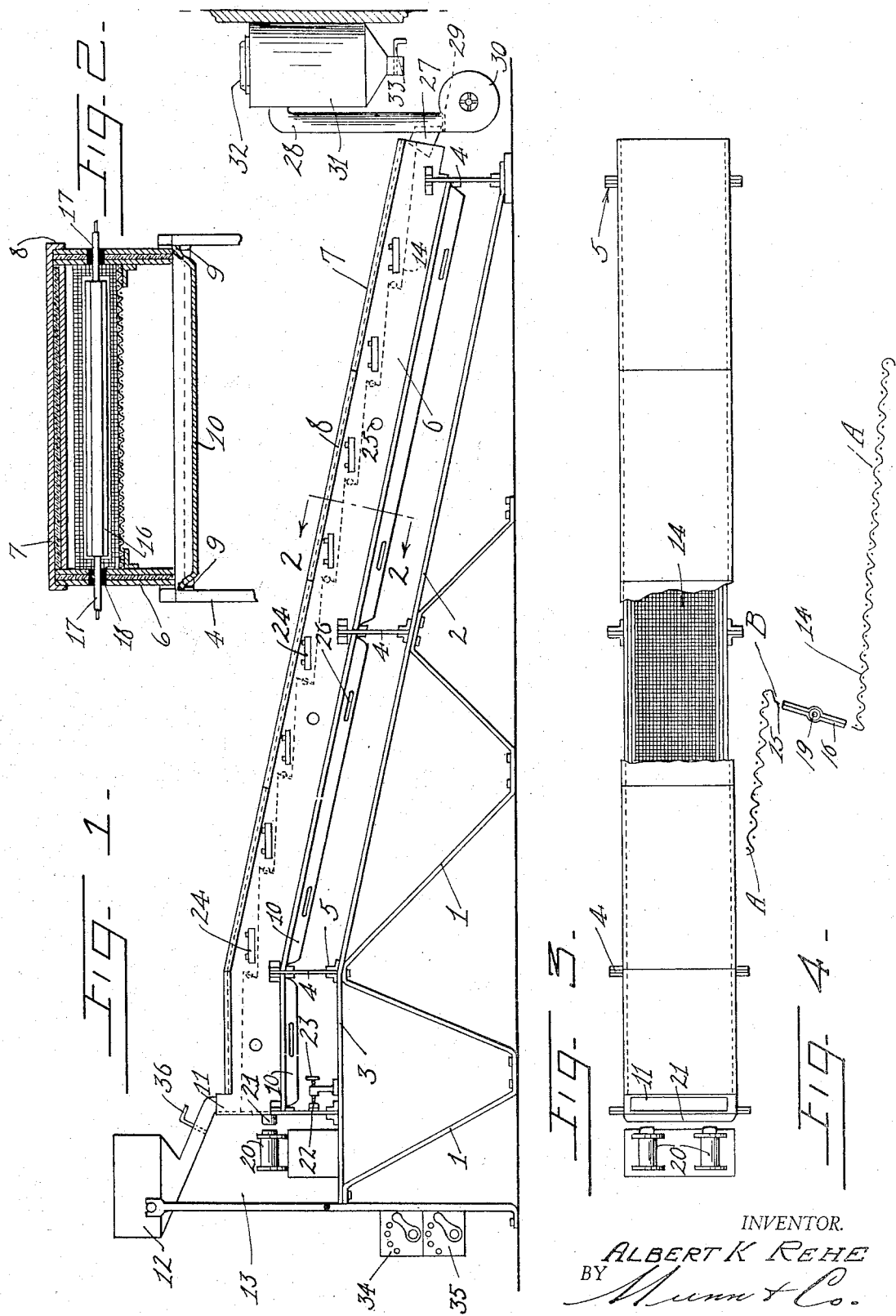

1,783,673

UNITED STATES PATENT OFFICE

ALBERT K. REHE, OF SAN FRANCISCO, CALIFORNIA, ASSIGNOR OF ONE-HALF TO REGINALD A. KUCICH, OF SAN FRANCISCO, CALIFORNIA

CONTINUOUS COFFEE ROASTER AND STORER

Application filed September 4, 1929. Serial No. 390,306.

My invention relates to improvements in continuous coffee roasters and storers and it consists in the combinations, constructions and arrangements hereinafter described and claimed.

An object of my invention is to provide a continuous coffee roaster and storer in which the coffee is fed upon a series of inclined planes that are heated by electricity, these planes being oscillated by magnets so as to cause the coffee beans to move from plane to plane and to finally be ejected from the roaster. From here, the coffee is conveyed to a storage bin by a current of air which will also separate the coffee beans from any foreign material before conveying the coffee to the storage bin. The air is also used in cooling the roasted coffee.

The device may be controlled so as to roast the coffee for the desired length of time. The device is extremely simple in construction and is durable and efficient for the purposes intended.

Other objects and advantages will appear in the following specification, and the novel features of the device will be particularly pointed out in the appended claims.

My invention is illustrated in the accompanying drawing forming a part of this application, in which Figure 1 is a side elevation of the device;

Figure 2 is a section along the line 2—2 of Figure 1;

Figure 3 is a top plan view of the roaster; and

Figure 4 is a side elevation of a part of the roaster.

In carrying out my invention, I provide a supporting frame indicated generally at 1. This frame has an inclined portion 2 and a horizontal portion 3. A coffee roaster is mounted upon the frame and is supported by legs 4 that are made of strap spring steel. The legs are secured to the inclined portion 2 and the horizontal portion 3 of the frame by brackets 5 or other suitable fastening means.

The roaster is designed to roast coffee, cocoa beans, cereals, peanuts, etc. The roaster comprises side walls 6 supported by the legs 4 and a top 7 supported by the side walls 6. The side walls are composed of three layers consisting of two layers of metal enclosing a layer of asbestos. The cover is formed in the same manner and is made sectional as shown in Figure 1 so as to permit its removal. The cover has side flanges 8 for securing it to the roaster.

The legs 4 carry supporting bars 9 that extend transversely across the roaster. Chaff trays 10 are slidably supported by the bars 9 and may be removed when desired. The trays also form the bottom of the roaster. The roaster has an inlet opening 11 for receiving green coffee from a hopper 12 or other suitable coffee-carrying device. The hopper 12 is supported by arms 13 that in turn are pivotally connected to the frame 1 for a purpose hereinafter described. Within the roaster, I mount a screen 14, see Figure 4, constructed of heavy wire, and having a mesh large enough to permit the chaff to fall through, but small enough to prevent the coffee beans from dropping therethrough. The wire 14 is formed in a series of steps A, and the rise B between the steps is inclined and is provided with an opening 15 for receiving a heating element 16. The heating element does not touch the screen, but is supported within the opening 15 by arms 17 that are mounted in the sides 6 and insulated therefrom by insulating bushings 18.

Figure 2 shows how the arms 17 are supported, while Figure 4 shows the particular construction of the heating element 16. It will be noted from this figure that the element is formed of two plates, these plates enclosing a rod 19 that is heated by a current passing therethrough. The rod, when heated, heats the plates, and the plates in turn radiate heat that will warm the tops and bottoms of the steps A. The heating element 16 in Figure 4, for example, will roast the coffee beans on the step A to the right of the element and will warm the bottom of the step A to the left of the element.

The heating elements are designed to create a temperature of from 400 to 500 degrees F. within the roaster.

The steps are inclined slightly so as to cause the coffee beans to move to the right and to drop from step to step. The means for causing movement of the roaster consists of magnets 20 acting upon a magnetizable bar 21. When the magnets 20 are energized, they will pull the bar 21 to the left. The bar is secured to the roaster and therefore will pull the roaster to the left, thus flexing the legs 4. The circuit is broken when contacts 22 separate, and the spring tension of the legs will move the roaster to the right. The contacts 22 are closed when the roaster moves to the right, and close a circuit through the magnets which repeat the operation. This results in an oscillation of the roaster, which is sufficient to cause the coffee beans to gradually move the right. The length of the stroke of the roaster and the period of vibration can be regulated by an adjusting screw 23 that moves one of the contacts 22.

Doors 24 are provided in the sides 6 and permit the coffee to be viewed as it passes through the roaster. Thermostats 25, see Figure 1, are also mounted on the sides 6 and show the temperature within the roaster. The trays 10 are provided with openings 26 that may be used as hand holes for removing the trays. These openings also permit a certain amount of circulation of air into the roaster.

The roasted coffee is delivered to a chute 27, and this chute carries the coffee to a vertically-disposed conduit 28. A screen 29 is placed at the bottom of the conduit and in advance of a blower 30. The blower lifts the coffee through the conduit 28 and conveys it to a storage bin 31. The pipe 28 enters near the top of the storage bin in such a manner as to cause a circulation of air within the bin.

The air is slowed down before it can pass out through an opening 32 in the top of the bin. The coffee is dropped by gravity into the bottom of the bin 31, while the air is permitted to escape. A valve 33 is used for controlling the outlet of the roasted coffee from the bin.

From the foregoing description of the various parts of the device, the operation thereof may be readily understood.

The frame carries two rheostats 34 and 35, one of which controls the current to the magnets 20, while the other controls the current to the heating elements 16. A damper 36 is opened for permitting the green coffee beans to flow from the hopper 12 to the roaster. The coffee, upon entering the roaster, is gradually roasted and is kept moving by the inclined steps A and the vibration of the roaster. The coffee is thoroughly mixed as it passes through the roaster and is heated from all sides, due to the arrangement of the steps A and the angle at which the heating elements 16 are disposed. Any heavy foreign substance is caught by the screen 29, and only the lighter coffee beans are forced into the bin 31. The air that carries the coffee beans to the bin also acts as a cooler for the product.

I have found that the roasting of the coffee beans by electricity saves 2% or more of shrinkage in the coffee beans. The device improves the product and provides a more perfect roasted coffee bean. The roasting is done in 10 to 12 minutes as against 20 minutes or more now used. It is obvious that the device can be used as a roaster or as a drying or evaporating process. The device is free from smoke, excessive heat and may be disposed in a smaller space than is now occupied by roasters. One of the principal advantages lies in the fact that the device performs a continuous roasting process for the coffee beans. The device may be operated readily, and the heating time can be controlled by means of the adjustable screw 23. The large part of the heat from the elements 16 is in the form of radiant heat which passes to the coffee beans in straight lines and is not influenced by air currents. The heat in the roaster is transferred to the coffee beans by convection and radiation.

It should be noted that the heat generated within the casing will flow from the exit end toward the inlet end due to the slanting of the casing. This heat will help roast the green coffee as it moves over the screen and before it comes into the area affected by the first heating element. This is the reason for providing the relatively long travel for the green coffee before it is brought near the first heating element. In this way I make use of all surplus heat.

The entire roaster comprises only one moving part, i. e. the casing, and this part needs no lubrication because it causes the supporting legs to flex during its movement. It will be seen that there is no wear and tear on the machine.

Electric heat has a greater penetrating power than other fuel. This heat roasts the coffee beans evenly throughout. There is also a less loss of coffee oils due to evaporation when roasting the coffee by electric heat than by heat from fuel.

Although I have shown and described one embodiment of my invention, it is to be understood that the same is susceptible of various changes, and I reserve the right to employ such changes as may come within the scope of the appended claims.

I claim:

1. A continuous roaster comprising a casing, an inclined conveyor for carrying the articles to be roasted, magnetic means for oscillating the conveyor for causing the articles to move from one end thereof to the exit end, and electric heaters for roasting the articles, said conveyor having steps therein for causing the articles to be turned over as they advance from step to step, said electric heaters being placed in the rises and being inclined for sending heat rays against the tops and bottoms of said steps.

2. In a coffee roaster, a screen having a plurality of steps and falls therein, flat electric heating elements placed in said rises and being inclined for heating the top and bottom of the screen.

3. A continuous roaster comprising a casing, an inclined conveyor for carrying the articles to be roasted, means for oscillating the conveyor for causing the articles to move from one end thereof to the exit end, and heating means for roasting the articles, said conveyor having steps therein for causing the articles to be turned over as they advance from step to step, said heating means being placed in the rises and sending heat rays against the tops and bottoms of said steps.

4. In a coffee roaster, a coffee supporting member having a plurality of steps and falls therein, and heating elements placed in said falls for heating the top and bottom of the member.

ALBERT K. REHE.